United States Patent [19]

Tutt et al.

[11] Patent Number: 5,051,929

[45] Date of Patent: Sep. 24, 1991

[54] ELECTRONIC MEMORY STATE REALLOCATION SYSTEM FOR IMPROVING THE RESOLUTION OF COLOR CODING VIDEO SYSTEMS

[75] Inventors: Timothy T. Tutt; Wayne D. Jung, both of Skokie; Raphael K. Tam, Glenview, all of Ill.

[73] Assignee: Interand Corporation, Chicago, Ill.

[21] Appl. No.: 109,951

[22] Filed: Oct. 19, 1987

[51] Int. Cl.[5] ........................ G09G 1/28; G06F 15/20

[52] U.S. Cl. .................................... 364/521; 340/703; 358/27; 364/518

[58] Field of Search .............................. 364/518, 521; 340/700-703, 731; 358/27, 43, 42, 11

[56] References Cited

U.S. PATENT DOCUMENTS

| | | | |
|---|---|---|---|
| 4,564,915 | 1/1986 | Evans et al. | 364/521 |
| 4,578,673 | 3/1986 | Yianilos et al. | 358/27 X |
| 4,580,134 | 4/1986 | Campbell et al. | 340/798 X |
| 4,603,231 | 7/1986 | Reiffel | 178/19 |
| 4,628,467 | 12/1986 | Nishi et al. | 364/521 |
| 4,635,048 | 1/1987 | Nishi et al. | 340/703 |
| 4,646,166 | 2/1987 | Arlan | 358/42 X |
| 4,654,484 | 3/1987 | Reiffel | 379/53 |
| 4,743,959 | 5/1988 | Frederiksen | 358/11 |

*Primary Examiner*—Heather R. Herndon
*Attorney, Agent, or Firm*—Alan R. Loudermilk

[57] ABSTRACT

The present invention provides means and methods for generating high resolution color computer generated graphic elements, such as lines, circles and curves, using a modified color-under coding system. A portion of the original luminance grey scale is reassigned or reallocated for substitution with data for high resolution graphic elements. High resolution graphic data are introduced by a user-operated input device via a control device such as a computer. The input luminance signal is digitally limited and stored in video random access memory (VRAM). A level detector detects the Y signal level to determine the presence of certain Y signal levels. Memory look-up tables provide appropriate user-determined substitute values for the Y, I and Q data values where certain, preselected Y signal levels are detected.

49 Claims, 4 Drawing Sheets

ELECTRONIC MEMORY STATE REALLOCATION SYSTEM FOR IMPROVING THE RESOLUTION OF COLOR CODING VIDEO SYSTEMS

BACKGROUND OF THE PATENT

1. Field of the Invention

The present invention relates generally to the field of color video imaging, and more particularly to means and methods for generating high resolution color graphic elements, such as lines, circles and curves, using a color-under coding system in which selected grey scale levels are allocated or "stolen" for substitution with data for high resolution graphic elements.

2. Description of Prior Art

Computer graphics are used in a multitude of applications, such as engineering design, business presentations, interactive video image teleconferencing and broadcast television productions. Raster-scan devices have proven to be the superior display medium for computer graphics in such applications.

The demand for more precise graphics has led to the development of high resolution systems. In the present art, black and white displays typically provide higher resolution than do color displays. This is because black and white displays require only luminance information to produce an image, while color displays must also include chrominance information to produce a color image.

Transmitting image data is typically very expensive and complex using conventional broadband video transmission media. Due to the cost and complexity of broadband transmission equipment, it is desirable to convert video signals from high bandwidth signals to low bandwidth signals, thereby enabling transmission over suitable low bandwidth media, such as voice grade telephone lines. Ideally, this high to low bandwidth conversion reduces the amount of information transmitted per unit time, resulting in reduced cost of transmission while still providing a high quality image. Coding of color video images is conventionally achieved in high bandwidth broadcast television. In freeze frame applications it is also known to code images through the use of a coding technique known in the art as "colorunder" coding.

As is known in the art, conventional color-under coding systems convert a color image from a high bandwidth signal to a lower, limited bandwidth signal. The limited bandwidth signal is digitally encoded by dedication of a specific number of bits per picture element (pel) to the encoded luminance signal and the chrominance signals, where Y is the luminance signal (coded at a higher bandwidth relative to the chrominance signals) and the I and Q are the chrominance signals (coded at a lower bandwidth relative to the luminance signal). The pel in the color-under coding system is a digital representation of the color and brightness of each element of the subject video image as specified by a finite number of bits of luminance and chrominance data.

U.S. Pat. No. 4,654,484, issued Mar. 31, 1987, to L. Reiffel, et al., for "Video Compression Expansion System" (the "'484 Patent"), which is hereby incorporated by reference describes the memory organization in a conventional color-under coding system and describes how color-under coded data can be used and transmitted in a video data compression/expansion application. The video random access memory, or VRAM, of the color-under coding system stores the luminance data (Y) at high spatial resolution with limited levels of grey, and the chrominance data (I and Q) at a more limited resolution with many color representations. Tests have indicated that the human eye has greater sensitivity to the resolution of the luminance information in an image than to the resolution of the chrominance information in an image.

The display format of the typical color-under coding system is commonly referred to as an octant of pels, or simply an octant. The name octant is derived from the characteristic conventional grouping of pels into groups of eight (8), in which each pel of the octant has an independent luminance value, while all pels in the octant share a common chrominance value. The octant-grouped color-under coding system stores video image data, for example, as six (6) bits of luminance data per picture element (pel) and one (1) bit each of I and Q data per pel. The chrominance information, I and Q data, are each typically represented by eight (8) bits of information per octant, or two (2) bits of information per pel, in the conventional color-under coding system. Hence, in conventional color-under coding, I and Q data bits from the eight (8) pels in the octant, grouped as two (2) rows of four (4) pels per octant, are needed to represent the common I and Q chrominance data for the pels in that octant. Thus, each octant is defined by sixty-four (64) bits of information, six (6) bits of luminance information per pel, totaling forty-eight (48) bits per octant, plus sixteen (16) bits of octant-shared I and Q data, eight (8) bits of I data and eight (8) bits of Q data. While the '484 Patent discloses a "sextant" of pels for storing two (2) chrominance signals, the same principles are applicable to an "octant" of pels.

As described above, the luminance value for each of the eight (8) pels in each octant is independent from the other pels in the octant. For example, the luminance values for two (2) adjacent pels in the same octant could be such that the luminance value for one pel is black while the luminance value for the adjacent pel is white. However, in the conventional color-under coding system only one chrominance value can be assigned to all eight (8) pels in the octant. Although the color-under coding system critically limits the ability to create high resolution color graphic elements such as lines, circles and curves.

As an example of the limitations of the conventional color-under coding system, it is illustrative to consider the attempted creation of two (2) red pels isolated in a field of white pels using prior art techniques. If a red line one (1) pel wide and two (2) pels long is drawn through an octant, the luminance state for the two (2) red pels is set at the luminance level for red for that particular red line, for example, 100% luminance. Further, for this example, it is desirable to set the luminance for the remaining six (6) pels of the octant to the luminance value representing white, thus representing a fully saturated red line on a white background. In conventional colorunder coding systems, however, only one (1) chrominance state can be set for the entire octant. Therefore, the entire octant must be set to the chrominance state (chrominance=red) of the two (2) red pels in order to produce any red pels within the octant. The result is eight (8) red pels and no field of white because all eight (8) pels in the octant have 100% luminance and red chrominance.

Since the entire octant is set to red in the attempt to produce two (2) red pels, the line width and length are distorted by factors of two (2) and four (4), respectively, over the desired dimensions. The undesired distortion of the desired line dimensions produces an extremely prominent "saw-toothed" effect along the edges of the line, such that lines are composed of eight (8) pel octants instead of single pels. The octant, composed of eight (8) pels, essentially acts as a single "superpel" such that the color of the octant, determined by the luminance and chrominance data of the pels in the octant, is controlled by the common chrominance data for the eight (8) pels in the octant.

Since the chrominance value for an entire octant of pels is set to a single state, it is impossible to set any one (1) pel of the other eight (8) pels in the octant to another color. Therefore the ability to create high resolution color graphics is limited in the conventional color-under coding system. In contrast, as described below, the present invention overcomes all of the foregoing limitations.

Accordingly, it is an object of this invention to provide high resolution color graphics using color-under coding of video images.

It is a further object of this invention to provide such high resolution graphics using color-under coding of video images while maximizing the efficient utilization of available memory by retaining most of the data compression benefits achieved in conventional color-under coding.

Finally, it is an object of this invention to provide high resolution graphics using color-under coding of video images for use with a variety of input devices.

SUMMARY OF THE INVENTION

The present invention comprises a video frame buffer random access memory system (VRAM), such as is described in the '484 Patent, in conjunction with means and methods to limit the range of the levels or states of the luminance (Y) data, detect the Y data state and provide appropriate substitute Y, I and Q data states via look-up tables when particular, preselected Y data values are detected.

The input signal to the present invention is typically an analog red, green, blue (RGB) video signal from a conventional video output device such as a video camera. The analog RGB signal is converted to an analog YIQ (wide-band luminance and narrow-band chrominance) signal through a conventional matrix encoder. Alternatively, a YIQ analog signal generated directly by an appropriate video device could be used as an input signal to the present invention.

The Y signal output from the matrix encoder is input to a conventional 6-bit high-speed "flash" analog to digital converter (ADC). The digital Y data output from the ADC is input to a digital delay line. The output of the digital delay is then input to a digital limiter. The ADC and the digital limiter "abbreviate" or limit the original grey scale to a grey scale with fewer states. The grey scale states thus removed from the original grey scale by the limiting operation are available for reallocation or reassignment, to be used, for example, to represent predetermined colors to be substituted for specified pels.

Defining the original grey scale as having [m . . . q] levels or states ("levels" and "states" are used interchangeably herein), in the preferred embodiment of the present invention, the incoming data is limited prior to storage in the VRAM to [m . . . n] grey levels, where n is less q. This [m . . . n] set of original grey scale levels is referred to as the "abbreviated" grey scale. The limiting of the incoming luminance signal is accomplished by adjusting the gain and the offset of the ADC to a level that, in the preferred embodiment, will permit only fifty-six (56) distinct grey levels. Even though the adjusted ADC limits the majority of luminance data, the digital limiter ensures that no stray grey data greater than level n is stored in the VRAM. This method of the present invention restricts the incoming luminance signal to the p-m (where p is equal to n+1) levels of grey that result from the ADC gain and offset adjustmen and the digital limiting.

The number of luminance levels of grey in the preferred embodiment of the present invention is sixty-four (64). Further, in the preferred embodiment the "abbreviated" grey scale is [0 . . . 55], while the "reassigned" grey scale [p . . . q] is [56 . . . 63]. Luminance data in the grey levels [56 . . . 63] are not allowed in VRAM as valid grey levels. Instead, grey levels [56 . . . 63] are allocated or "stolen" to be used to represent states in which Y, I and Q data from look-up tables are substituted to generate high resolution graphics. Alternatively, other grey level regions of the original grey levels could be selected as the "stolen states", such as the lowest levels, where of the total [m . . . q] states, [p . . . q] is the abbreviated grey scale, and [m . . . n] is the reassigned grey scale.

In another alternative embodiment of the present invention, an algorithm implemented in software is used to "comb" the luminance data to either eliminate levels of grey greater than [n] for the case where the abbreviated grey scale is [m . . . n], or levels of grey less than [p] for the case where the abbreviated grey scale is [p . . . q]. In this embodiment the software is programmed to inspect and limit the levels of grey so that prior to the addition of high resolution graphics data there are no luminance data in the VRAM resident in the states designated for "stealing". This combing operation assures that a stray luminance data pel greater than level n (or less than p in the alternative embodiment where the abbreviated grey scale is [p . . . q]) is not interpreted as a stolen state color pel.

Buffer memory is used to store the luminance data output from the digital limiter for three (3) pels. When the data from the fourth pel is output from the digital limiter, the data from the buffer memory and the digital limiter are stored in the Y portion of the VRAM. Storing of the Y luminance data from the four (4) pels is timed to coincide with the storing of the I and Q chrominance data for the corresponding four (4) pels, as more fully described below.

In the preferred embodiment, a clock drives the Y data ADC at, for example, approximately 12 megahertz. A clock for the I and Q 8-bit ADC operates at a frequency $\frac{1}{4}$ the frequency of the Y ADC clock (3 megahertz for the above example). I and Q data collectively are sampled at $\frac{1}{4}$ the rate of Y data. Since luminance (Y) data is sampled on each field. (and stored in VRAM) and I and Q chrominance data are sampled alternately on alternate fields (and stored in VRAM), both I and Q are effectively sampled and stored at a frequency $\frac{1}{8}$ that of Y data.

In the preferred embodiment, the Y data are stored in states [0 . . . 55]. States [56 . . . 63] are not used for storage of luminance data in the VRAM because of the limiting described above. States [56 . . . 63] can only be accessed by a control device such as a computer via the VRAM memory write lines when use of the stolen states is enabled by the computer. Graphics, such as lines, circles and curves, composed of many individual state stolen pels, can be represented in any of the predetermined reassigned grey scale states, [56 . . . 63]. The reassigned states are available for representation of preselected colors, which can range from white to black to any available hue, saturation and intensity combination. The method of input for the computer generated graphics can be from conventional user-controlled input devices such as a mouse, joystick, stylus, light pen, etc., which can be connected serially or in parallel, as well as machine generated graphics such as programs generated with or without user instructions.

The present invention permits the user to create high resolution graphics by using individual color pels to draw lines, circles and curves. Further, single pel color lines can be drawn adjacent to each other, permitting highly detailed color graphics. Previously the user could only draw single octant lines adjacent to each other. The present invention provides single pel spatial resolution graphics while the same graphics, created with conventional color-under coding is four (4) times the size in the horizontal dimension, and two (2) times the size in the vertical dimension. The user is provided with the ability to draw graphics as fine as single pel lines while still retaining most of the data compression benefits of using octants in a color-under system. The ability to create color graphics using single pels instead of octants, as in the prior art, decreases the prominence of the saw-toothed effect created in drawing graphics.

When generating color graphics, the system CPU conventionally sets a VRAM write protect register to write protect the I and Q data planes, which in the preferred embodiment are the two (2) most significant bit planes. Either a read-modify-write or a write protect routine is performed to preserve the I and Q data planes when a computer writes into the luminance portion of the VRAM. This write protect operation for preventing undesired overwriting of certain memory locations, which is known in the art, preserves the I and Q states for the pels in the octant which are not altered by the state stealing operation so that the background of the area where the state stealing operation is implemented is not changed. The CPU generating the substitute graphics data transfers the substitute data to the appropriate corresponding VRAM locations via the control, address and data buses.

A CPU interface connects the system to the microprocessor, which controls the data flow to and from the VRAM over the address bus, data bus and control bus. The microprocessor controls the transfer of the high resolution graphics created, for example, on an electronic writing apparatus to the image stored in the VRAM. The electronic writing apparatus in the preferred embodiment of the present invention is disclosed in U.S. Pat. No. 4,603,231, issued July 29, 1986, to Reiffel, et al., for "System for Sensing Spatial Coordinates" (the "'231 Patent"), which is hereby incorporated by reference. While the '231 Patent is particularly suitable for the preferred embodiment of the present invention, it is understood that other electronic writing systems, such as mouse or light pen controlled systems, are suitable for use in the present invention.

The graphics created using the electronic writing apparatus are transferred from the electronic writing apparatus to the microprocessor via a data bus in a conventional manner. The graphics are then transferred to the VRAM via an appropriate CPU interface, also in a conventional manner.

The analog I and Q chrominance input signals pass to an analog switch which is gated by a signal representing what is known in the interlaced video art as the video field state signal. In the preferred embodiment, this signal is used to control the sampling of the I and Q signals such that the I and Q signals are sampled on alternate fields, odd and even, respectively. The output of the analog switch is input to an 8bit high speed or "flash" ADC.

The VRAM is organized into six (6) luminance bit planes and two (2) chrominance bit planes. In the preferred embodiment, the least significant bit planes, designated $2^0$ through $2^5$, are used to store the limited Y data. Bit planes designated $2^6$ and $2^7$ are used to store I and Q data. I and Q data are stored in bit planes $2^6$ and $2^7$ on alternating video lines such that I data is stored on all odd video lines on bit planes $2^6$ and $2^7$ and Q data is stored on all even video lines on bit planes $2^6$ and $2^7$.

The six (6) bits of the output Y data from VRAM are input to a level detector which determines whether or not the output Y data exceeds the [m . . . n] levels of the abbreviated grey scale, [0 . . . 55] in the preferred embodiment. If the Y output is [0 . . . 55], there is no change in the Y data state, and the Y, I and Q data pass through their respective look-up tables without substitution. The digital YIQ data are processed by digital to analog converters (DACs). The output of the DACs are the reconstituted analog YIQ signal components, which are processed by a conventional matrix decoder to form the respective RGB signal output. In alternative embodiments, the YIQ data are output directly to conventional YIQ input-compatible display devices.

If the output Y data from VRAM is in the range [p . . . q] ([56 . . . 63] in the preferred embodiment), as determined by the level detector, the look-up tables are used to supply substitute output values for the Y, I and Q data states. The look-up tables determine the value of the data as designated by the color indexed for the substituted Y, I and Q data states. The substitute digital data states are synchronously injected into the respective data paths. The substituted digital YIQ data are processed by the respective DACs to produce the equivalent analog YIQ signal components. The analog YIQ signal components are then processed by the matrix decoder to form the corresponding RGB signal components and displayed on the display device. Display devices for the present invention are not limited to CRTs or video monitors, but include liquid crystal displays (LCDs) and plasma displays.

A better understanding of this invention may be gained from a consideration of the following detailed description, presented by way of example, with reference to the accompanying drawings.

DETAILED DESCRIPTION OF PREFERRED EMBODIMENT

Figure 1:
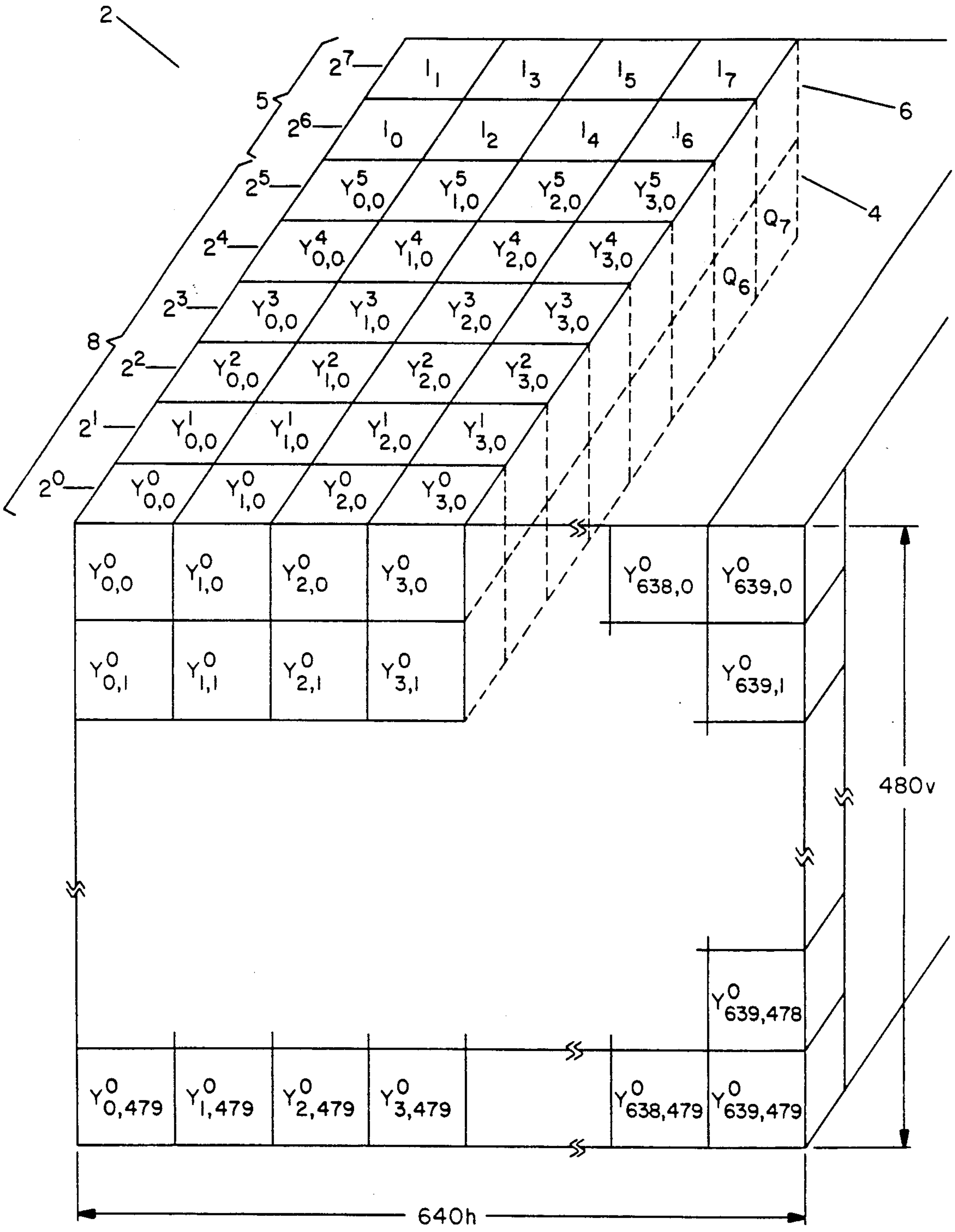
FIG. 1 is a diagram illustrating the organization of the video frame buffer random access memory (VRAM).

In describing the preferred embodiment of the invention illustrated in the drawings, specific terminology will be resorted to for the purpose of clarity. However, the present invention is not intended to be limited by the specific terms so selected and it is to be understood that each specific term is inclusive of all technical equivalents which operate in a similar manner to accomplish a similar purpose. Also in the preferred embodiment of the present invention, VRAM capacity (including the number of bits dedicated for Y, I and Q data), signal type, and signal level specifications have been selected. It should be understood however, that alternative specification levels and values can be selected to practice the present invention.

In the preferred embodiment, the resolution of the video image to be digitally stored in the VRAM is 640 picture elements (pels) per horizontal line and 480 displayable television lines per image. The video image is stored in the VRAM as in a conventional color-under coding system. As is known in the art, conventional color-under coding systems convert a color image from a higher bandwidth signal to a limited, lower bandwidth signal. The limited bandwidth signal is encoded by dedication of a specific number of bits per picture element (pel) to the encoded luminance and chrominance signals, where Y is the luminance signal (stored at a higher bandwidth relative to the chrominance signals) and the I and Q are the chrominance signals (stored at a lower bandwidth relative to the luminance signal).

In the conventional color-under system the horizontal luminance-to-chrominance spatial resolution is 4 to 1 and the vertical luminance-to-chrominance spatial resolution is 2 to 1. Luminance data is stored in six (6) bits per pel for each pel in the octant, yielding $2^6$ or sixty-four (64) levels of grey. The I and Q chrominance data are stored in eight (8) bits per octant, I and Q each having 256 levels of "color" per octant for a combined total of approximately 64,000 combinations. The "pel" in the color-under coding system is a digital representation of the color and brightness of each element of the subject image as specified by a finite number of bits of luminance and chrominance data.

As shown in FIG. 1, in the preferred embodiment of the present invention, VRAM 2 is organized into eight (8) bit planes, $2^0$ thru $2^7$, denoted in FIG. 1 as bit plane groups 5 and 8. Also in the preferred embodiment, each bit plane has 640 pels by 480 lines of video information.

Further, VRAM 2 comprises memory storage for eight (8) bits of image data per pel, where the image data for each pel is divided as follows: six (6) bits located on six (6) planes, denoted in FIG. 1 as bit plane group 8, are allocated to the Y luminance data and two (2) bits per pel located on two (2) planes, denoted in FIG. 1 as bit plane group 5, are alternately designated to I chrominance data 6 and Q chrominance data 4. In the preferred embodiment, the I and Q data are stored on alternating video lines of bit planes $2^6$ and $2^7$ bit plane group 5. In an alternate embodiment, I data are allocated to either bit plane $2^6$ or $2^7$ and Q data are allocated to either bit plane $2^6$ or $2^7$, whichever is not dedicated to I data.

Figure 2:
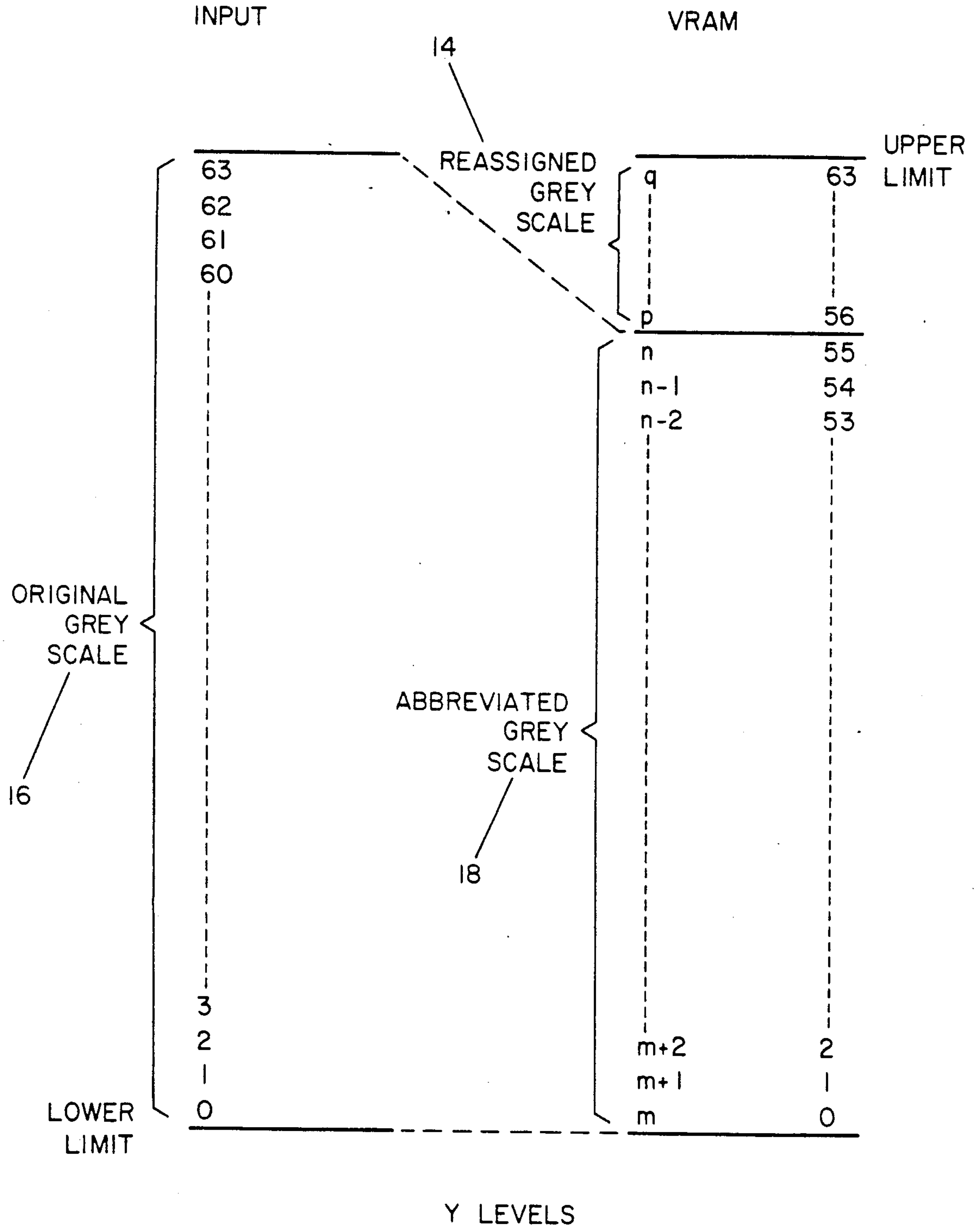
FIG. 2 is a diagram illustrating the luminance grey level allocation in the preferred embodiment of the present invention.

FIG. 2 illustrates the allocation of grey levels in the preferred embodiment. As shown in FIG. 2, the Y data have the potential for [m . . . q] original levels of grey scale 16. The [m . . . q] levels of the original grey scale 16 are divided in the present invention into abbreviated grey scale levels 18 [m . . . n] and reassigned grey scale levels [p . . . q] 14. In the preferred embodiment of the present invention, m=0, n=55, $p=n+1=56$, and q=63. Abbreviated grey scale 18 is allocated by limiting the luminance signal to the original grey scale levels [0 . . . 55]. Reassigned grey scale 14 is allocated the original grey scale levels [56 . . . 63].

In an alternative embodiment of the present invention, the abbreviated grey scale still is allocated 56 grey levels; but in this embodiment the reassigned grey scale is scattered, randomly or periodically, throughout the range of the original grey scale, such that eight (8) grey levels of the original grey scale are allocated for substitution with higher resolution graphic data. The "scattered stolen state" alternative embodiment is visually less appealing than the preferred embodiment because the continuous grey levels are broken where a state is stolen from the grey levels. For example, when a continuously varying line of grey, from black to white is displayed, the scattered reassigned grey levels produce noticeable jumps in the grey transition, whereas the same continuously varying line of grey does not break or jump between levels of grey in the preferred embodiment.

Figure 4:
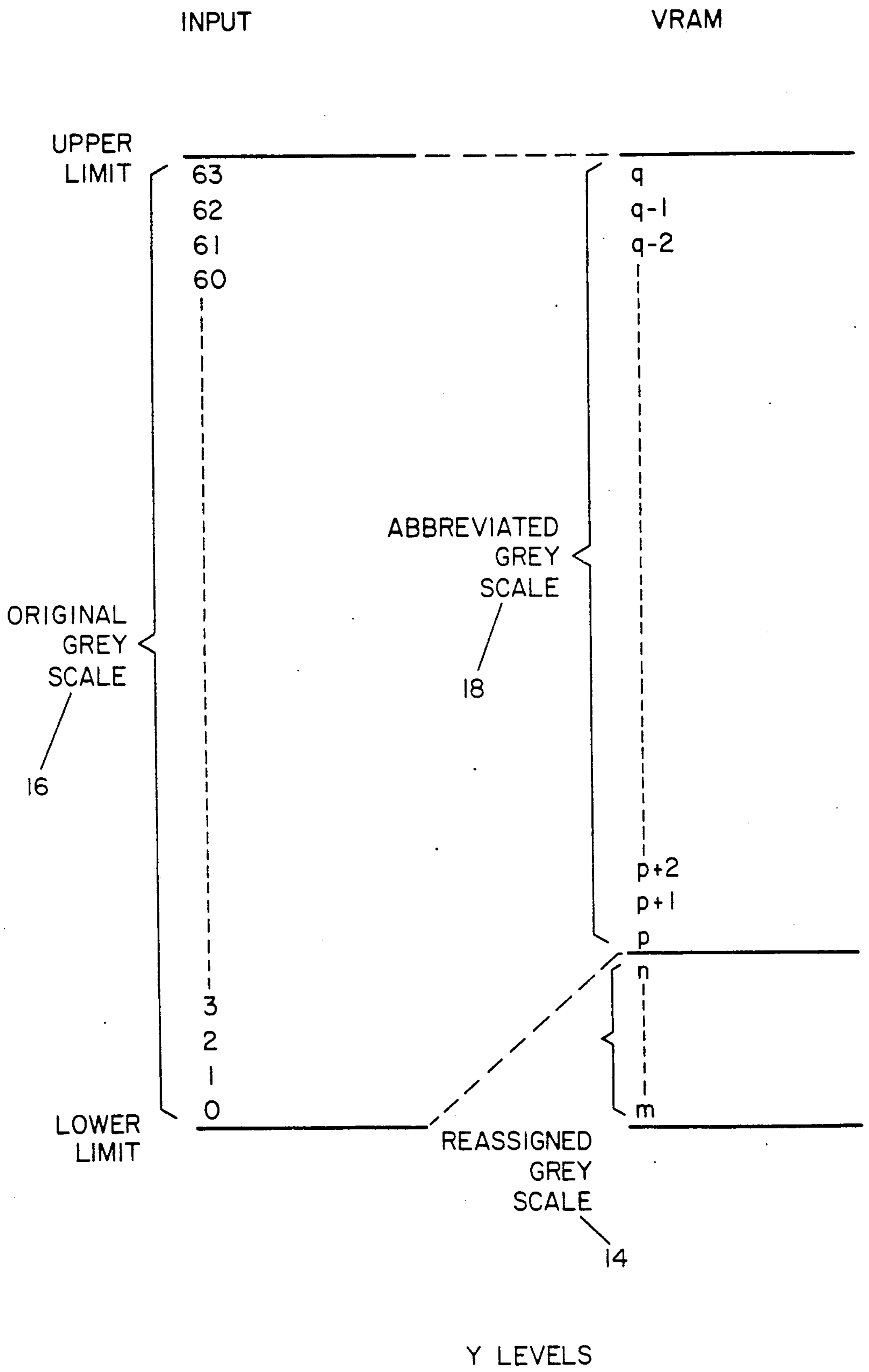
FIG. 4 is a diagram illustrating the luminance grey level allocation of an alternative embodiment of the present invention.

FIG. 4 illustrates yet another alternative embodiment of the present invention which uses the lower grey levels for the "stolen" or reassigned grey scale levels. The Y luminance signal has the potential for [p . . . n] original levels of grey scale 16. The [m . . . q] original levels of grey scale 16 are divided, for state stealing purposes, into an abbreviated grey scale 12, which is allocated the upper portion of the original grey scale levels [p . . . q] 16, and a reassigned grey scale 14, which are allocated the lower portion of the original grey scale levels [m . . . n].

For either of the embodiments illustrated in FIG. 2 or FIG. 4, the gain and DC offset of 6-bit analog to digital converter (ADC) 48 is adjusted so that the level of the blackestblack desired is coded as the lowest abbreviated grey scale state and the level of the whitest-white as the highest abbreviated grey scale state (or vice versa for inverted video). Thus, in the preferred embodiment, the entire black-to-white linear range is preserved, but the number of grey levels representing that range is reduced, a reduction not noticeable by a typical viewer. In alternative embodiments, the original grey level range is truncated at either end to make states available for reassignment. In such embodiments; however, picture quality might be compromised as a result of simple truncation of the original grey level range.

Figure 3:
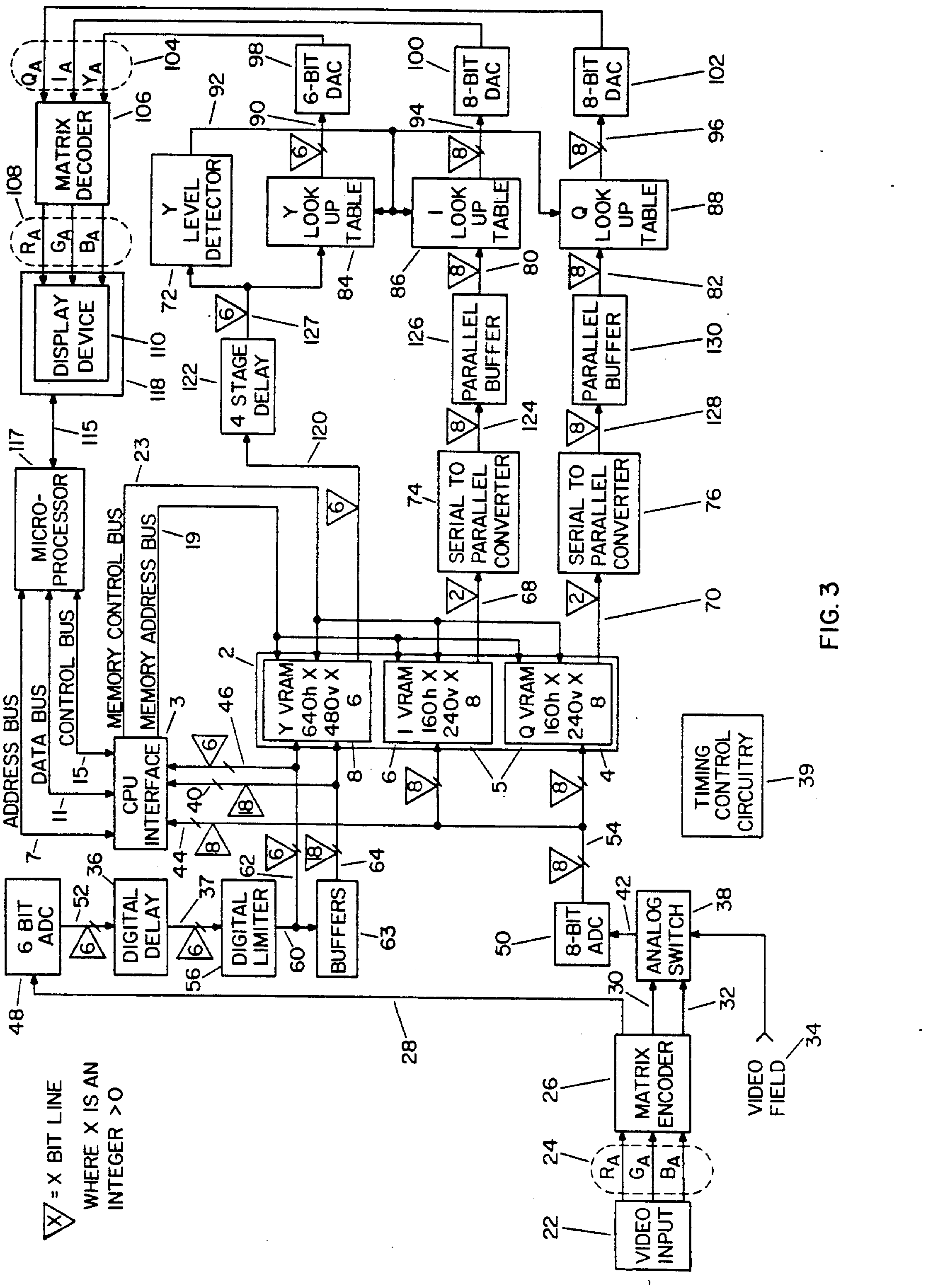
FIG. 3 is a block diagram of the present invention.

Referring to FIG. 3, the input signal to the system are analog RGB video signal components 24 from a conventional video input device 22 such as a video camera. Analog RGB video signal components 24 are converted to the corresponding analog YIQ (luminance and narrow-band chrominance) signal components 28, 30, 32 by conventional matrix encoder 26. The use of and circuitry for performing matrix encoding and decoding in such applications as the present invention is known in the art and is described in publications such as Chapter 8 of "Color TV Training Manual," published by Howard W. Sams and Co., Inc. (1977), which is hereby incorporated by reference.

Analog Y signal output 28 of matrix encoder 26 is input to 6-bit high speed analog to digital converter (ADC) 48. ADC 48, and ADC 50 discussed below, are conventional components known in the art, and in the preferred embodiment are Hitachi HA1920TP High-Speed & Low Power A/D Converters, the operating manuals and specification sheets for which are hereby incorporated by reference. The 6-bit digital Y data output 52 from ADC 48 is input to digital delay 36. Next, the 6-bit digital Y data output 37 from digital delay 36, is input to digital limiter 56. Digital limiter 56 limits the range of levels of Y data output 37 from digital delay 36 eliminating any stray luminance states above the abbreviated grey scale upper limit of 55. Digital limiter 56 limits the range of states of the Y data by assigning the upper limit state (55) to any data above the upper limit state. In the preferred embodiment, digital Y data output 60 from digital limiter 56 and the digital data from buffer memory 63 form the six (6)- least significant bits of the high speed digital data 62, 64 which is input to the Y portion of VRAM 2. Buffer memory 63 stores the luminance data output from digital limiter 56 for three (3) pels. When luminance data for the fourth pel is output from digital limiter 56, the luminance data from buffer memory 63 and digital limiter 56 are sequentially stored in VRAM 2 coincident with the I or Q data output from ADC 50 (discussed below) such that the luminance and chrominance data are stored in VRAM 2 in accordance with the memory map of VRAM 2 illustrated in FIG. 1.

Analog I signal 30 and analog Q signal 32 from matrix encoder 26 are input to analog switch 38. For non-interlaced video inputs, analog I signal 30 and analog Q signal 32 are alternately sampled on alternate video lines. For interlaced video inputs, analog switch 38 is gated by video field state signal 34 corresponding to either the analog I signal or the analog Q signal (odd field or even field, respectively). During field 0, or the even fields, the analog I signal 30 is sampled. During field 1, or the odd fields, the analog Q signal 32 is sampled. Y data 60 are sampled during both fields. Chrominance output 42 of analog switch 38 passes to an 8-bit flash ADC 50. Output 54 of ADC 50 is stored in I and Q portions 5 of VRAM 2.

In the preferred embodiment of the present invention the bit planes where the digital data resides in the VRAM 2 (detailed in FIG. 1) are organized as follows: the least significant bit planes, $2^0$ through $2^5$ denoted as bit plane group 8, are used to store Y data 60. I data 6 and Q data 4 are stored on alternating video lines in VRAM 2 as indicated by the reference numerals 6 and 4 in FIG.s 1 and 3.

Y data 60 are stored in VRAM 2 only in states [0 . . . 55], with states [56 . . . 63] not utilized due to the operation of AGC 48 and digital limiter 56 as described above. States [56 . . . 63] are reserved to be occupied by some form of high resolution graphic element data. The graphics are represented by any of the predetermined stolen states, redefined grey levels [p . . . q]. The color of the high resolution graphics can range from white to black to any hue, saturation and intensity combination. Input for the high resolution graphics can be generated by user controlled input devices such as a mouse, joystick, stylus, or light pen, etc., which can be connected serially or in parallel, as well as machine generated graphics programs generated with or without user interaction.

The preferred embodiment of the present invention utilizes stylus generated graphical input from a device such as the DISCON family of equipment manufactured by Interand Corporation, 3200 West Peterson Avenue, Chicago, Ill. 60659, the reference and operating manuals for which are hereby incorporated by reference. The following documents are included as references:

| Manual | Interand Document Number |
|---|---|
| DISCON 1000 Operator's Manual | TPM000870-02 |
| DISCON 725 Operator's Manual | TPM1471-00 |
| DISCON 725 Key Operator's Manual | TPM1470-00 |
| Telestrator 440 Operator's Manual | TPM0003-01 |
| FastScan 200 Operator's Manual | 0002-00 |

Equipment such as the DISCON 1000, DISCON 725, and Telestrator 440 utilize the apparatus described in the '484 Patent, referenced above.

When generating color graphics, VRAM 2 is set to write protect the two most significant bit planes, bit plane group 5 of FIG. 1 and FIG. 3 in a conventional manner. Either a read-modify-write or a write protect register routine is performed by the CPU on I and Q planes of bit plane group 5 to preserve these memory planes. This write protect operation preserves the I and Q data values for the pels in the octant which are not altered by the state stealing operation. This preserves the background of the area where the substituted high resolution graphic data are placed.

The device generating the graphics in the preferred embodiment, electronic writing apparatus 118, transfers the digital stolen state luminance and chrominance information corresponding to the pels to have high resolution graphics data substituted, directly to VRAM 2 via control bus 15, address bus 7, and data bus 11 and corresponding memory control bus 23, and memory address bus 19 between CPU interface 3 and VRAM 2, all in a conventional manner.

CPU interface 3 connects microprocessor 117 to the components of the preferred embodiment as illustrated in FIG.3. Microprocessor 117 controls the data flow to and from VRAM 2 over address bus 7, data bus 11, and control bus 15. Microprocessor 117 controls the transfer of the high resolution graphics created on electronic writing apparatus 118 to the image digitally stored in VRAM 2. Electronic writing apparatus 118 in the preferred embodiment of the present invention is disclosed in the '231 Patent which is reference above. While the '231 Patent is particularly suited for the preferred embodiment of the present invention it is understood that other electronic writing systems, such as mouse or light pen controlled systems, are suitable for use in the present invention.

Graphics created using electronic writing apparatus 118 are transferred from electronic writing apparatus 118 to microprocessor 117 via data bus 115. The graphics are then transferred to VRAM 2 via the data bus 11 through CPU interface 3, and data busses 40, 44 and 46 to the vacated VRAM memory states in a conventional manner.

I data 68 and Q data 70 are output from VRAM 2 in 2-bit serial format, which is converted to 8-bit parallel format by processing the data through I and Q serial to parallel converters 74 and 76, respectively. Converted parallel data outputs 124 and 128 from serial to parallel converter 74 and 76, respectively, are input to I and Q data parallel buffers 126 and 130, respectively, which accumulate data for four (4) iterations of the serial to parallel conversion process. The eight (8) bits of accumulated I and Q chrominance data (i.e., four (4) iterations of two (2) bit conversion) is passed to the look up tables in synchronization with the Y data that has been delayed in four (4) stage digital delay device 122 while the I and Q data are accumulated in parallel buffers 126 and 130, respectively. The eight (8) bits of I and Q data accumulated in parallel buffers 126 and 130, respectively, correspond to the chrominance information for one (1) octant of the stored image. 6-bit Y data output 120 from Y section 8 of VRAM 2 are delayed through four (4) stage delay 122, which permits the synchronization of 6-bit Y data 127 and the converted 8-bit I data 80 and Q data 82.

The six (6)- bits of output Y data 27 from four (4) stage delay device 122 pass to level detector 72 and Y look-up table 84. Level detector 72 determines whether or not digital output Y data 27 exceeds the [0 . . . 55] range allocated to abbreviated grey scale 18 in the preferred embodiment. If the Y data 27 are within the levels of abbreviated grey scale 18 [0 . . . 55], there is no change in Y data output 90 from Y look-up table 84 and the Y data passes through look-up table 84 unaltered. In this event, I data 80 and Q data 82 also are passed unaltered through I look-up table 86 and Q look-up table 88, respectively. In the preferred embodiment Y look-up table 84, I look-up table 86 and Q look-up table 88 are conventional memory devices such as random access memory (RAM) with contents of appropriate substitute luminance/chrominance data which is read out of the RAM at an appropriate time for insertion into the output signal path as discussed below. The substitute data values for the high resolution graphics are preloaded into the RAM of look-up tables 84, 86 and 88 by microprocessor 117 in a conventional manner. The use of memory devices such as RAM to construct a "look-up" table such as look-up tables 84, 86 and 88 of the present invention is also well known in the art.

Continuing with the situation where Y data 27 are within the levels of abbreviated grey scale 18, The components of digital YIQ data 90, 94 and 96 output from Y, I and Q look-up tables 84, 86 and 88, respectively, are processed through DACs 98, 100 and 102, respectively. The output of DACs 98, 100 and 102 corresponding analog YIQ signal components 104 Analog YIQ signal components 104 are then processed by matrix decoder 106 in a conventional manner to form corresponding RGB signal components 108 and displayed on display device 110. Display devices such as display device 110 of the present invention are not limited to CRTs or video monitors, but include liquid crystal displays (LCDs) and plasma displays.

If output Y data 27 from four (4) stage delay 122 is within the levels of reassigned grey scale 14 [56 . . . 63], as determined by level detector 72, output 92 from level detector 72 initiates a substitution of Y, I and Q data 90, 94 and 96, respectively, with appropriate data from look-up tables 84, 86 and 88, respectively. The data substituted for digital Y, I and Q data 90, 94 and 96, respectively, are appropriately synchornized and placed into the respective data paths. Substituted digital YIQ data 90, 94 and 96 are processed by respective DACs 98, 100 and 102 to produce equivalent analog YIQ signal components 104. Analog YIQ signal components 104 are then processed by matrix decoder 106 to form corresponding RGB signal components 108 and displayed on display device 110.

The present inventino permits the user to create high resolution graphics by using individual color pels to draw lines, circles and curves. Further, single pel color lines can be drawn adjacent to each other, permitting highly deteiled color graphics. The present invention highly eteiled color resolution graphics while the same graphics, created in prior art systems four (4) times the size in the horizontal dimension, and two (2) times the size in the vertical dimension. The present invention provides the user with the ability to draw graphics as fine as single pel ines while still retaining most of the data compression benefits of using octants in a conventional color-under system. The ability to create color graphics using single pels instead of octants, as in the prior art, decreases the prominence of the saw toothed effect created in drawing graphics.

Although the reassignment of eight (8) luminance levels as in the present invention reduces the number of color and grey combinations available to represent an image, any reduction in image quality is negligible. In the preferred embodiment, each cotant is represented by six (6) bits of luminance information per pel, providing sixty-four (64) levels of grey ($2^6$), and by sixteen (16) bits of shared chrominance information per octant (eight (8) bits of I and eight (8) bits of Q), providing 65,536 potential chrominance combinations ($2^8*2^8$). A total of approximately 4.2 million combinations of grey and color are possible in 8-bit prior art color-under systems while with the present invention only 3.6 million combinations of grey and color are possible. However, for the unusual situation where 3.6 million colors does not fully represent the subject image, the ability to create high resolution color graphics while minimizing system memory compensates for any loss of image quality.

Although the invention has been described in terms of a preferred embodiment, it will be obvious to those skilled in the art that many alterations and modifications may be made without departing from the invention. Accordingly, it is intended that all such alterations and modifications be included in the psirit and scope of the invention as defined by the appended claims.

What is claimed is:

1. An apparatus for inserting high resolution color graphic elements into a digitized color video image for display on a display device, wherein the color video image is stored in a memory as luminance data and corresponding chrominance data, comprising:

(a) limiting means connected to the memory for limiting the luminance data stored in the memory to values less than or equal to a predetermined threshold value;

(b) memory writing means connected to the memory for selectively writing to the memory substitute luminance data for certain of the stored luminance data, wherein the values of the substitute luminance data are greater than the predetermined threshold value; and (c) lookup table means connected to the memory for sequentially receiving from the memory the luminance data and corresponding chrominance data and for generating luminance data and corresponding chrominance data for display on the display device, wherein the luminance data and corresponding chrominance data generated by the lookup table means are equal to the luminance data and corresponding chrominance data received from the memory for luminance data received from the memory that are less than or equal to the predetermined threshold value and wherein the luminance data and corresponding chrominance data generated by the lookup table means are equal to luminance data and corresponding chrominance data representing high resolution color graphic elements for luminance data received from the memory that are greater than the predetermined threshold value.

2. The apparatus as claimed in claim 1 wherein the limiting means is a computer and computer program for reviewing the luminance data stored in the memory means, wherein the computer program limits the luminance data to values less than or equal to the predetermined threshold value.

3. The apparatus as claimed in claim 1 wherein the lookup table means comprises:

(a) a first lookup table means connected to the memory for generating luminance data and corresponding chrominance data in response to receiving luminance data from the memory that are less than or equal to the predetermined threshold value, wherein the luminance data and corresponding chrominance data generated by the first lookup table means are equal to the luminance data and corresponding chrominance data received from the memory; and (b) a second lookup table means connected to the memory for generating luminance data and corresponding chrominance data in response to receiving luminance data from the memory that are greater than the predetermined threshold value, wherein the luminance data and corresponding chrominance data generated by the second lookup table means are equal to luminance data and corresponding chrominance data representing high resolution color graphic elements;

wherein the luminance data and corresponding chrominance data generated by the lookup table means are equal to the luminance data and corresponding chrominance data generated by the first lookup table means for luminance data received from the memory that are greater than or equal to the predetermined threshold value and wherein the luminance data and corresponding chrominance data generated by the lookup table means are equal to the luminance data and corresponding chrominance data generated by the second lookup table means for luminance data received from the memory that are less than the predetermined threshold value.

4. The apparatus as claimed in claim 1 wherein the color video image is stored in a memory as luminance data and corresponding chrominance data, wherein the chrominance data are stored in memory at a lower resolution than are the luminance data.

5. A video graphic system for inserting high resolution color graphic elements into a digitized color video image for display on a display device, wherein color video signals are coupled to a video input of the video graphic system, wherein the color video signals are suitable for digitization into luminance data and corresponding chrominance data, and wherein the luminance data and corresponding chrominance data can be displayed on a display device, the video graphic system comprising:

(a) limiting means connected to the video input for limiting at least one of the color video signals coupled to the video input;

(b) digitization means connected to the limiting means for digitizing the color video signals output from the limiting means into luminance data and corresponding chrominance data, wherein the luminance data obtained from digitization of the color video signals are limited to values less than or equal to a predetermined threshold value;

(c) memory means connected to the digitization means for storing the luminance data and corresponding chrominance data;

(d) memory writing means connected to the memory means for selectively writing to the memory means substitute luminance data for certain of the stored luminance data, wherein the values of the substitute luminance data are greater than the predetermined threshold value; and (e) lookup table means connected to the memory means for sequentially receiving from the memory the luminance data and corresponding chrominance data and for generating luminance data and corresponding chrominance data for display on the display device, wherein the luminance data and corresponding chrominance data generated by the lookup table means are equal to the luminance data and corresponding chrominance data received from the memory means for luminance data received from the memory means that are less than or equal to the predetermined threshold value and wherein the luminance data and correspondign chrominance data generated by the lookup table means are equal to luminance data and corresponding chrominance data representing high resolution color graphic elements for luminance data received from the memory means that are greater than the predetermined threshold value.

6. The video graphic system as claimed in claim 5 wherein the color video signals are YIQ color video signals.

7. The video graphic system as claimed in claim 5 wherein the color video signals are RGB color video signals.

8. The video graphic system as claimed in claim 5, 5 or 6 wherein the limiting means is a computer and computer program for reviewing the luminance data stored in the memory means, wherein the computer program limits the luminance data to values less than or equal to the predetemrined threshold value.

9. The video graphic system as claimed in claim 5 wherein the lookup table means comprises:

(a) a first lookup table means connected to the memory for generating luminance data and corresponding chrominance data in response to receiving luminance data from the memory that are less than or equal to the predetermined threshold value, wherein the luminance data and corresponding chrominance data generated by the first lookup table means are equal to the luminance data and corresponding chrominance data received from the memory; and (b) a second lookup table means connected to the memory for generating luminance data and corresponding chrominance data in response to receiving luminance data from the memory that are greater than the predetermined threshold value, wherein the luminance data and corresponding chrominance data generated by the second lookup table means are equal to luminance data and corresponding chrominance data representing high resolution color graphic elements;

wherein the luminance data and corresponding chrominance data generated by the lookup table means are equal to the luminance data and corresponding chrominance data generated by the first lookup table means for luminance data received from the memory that are greater than or equal to the predetermined threshold value and wherein the luminance data and corresponding chrominance data generated by the lookup table means are equal to the luminance data and corresponding chrominance data generated by the second lookup table means for luminance data received from the memory that are less than the predetermined threshold value.

10. The video graphic system as claimed in claim 5 wherein the digitizing means digitizes the color video signals into luminance data and corresponding chrominance data, wherein the chrominance data are at a lower resolution than are the luminance data.

11. A method for inserting high resolution color graphic elements into a digitized color video image for display on a display device, wherein the color video image is stored in a memory as luminance data and corresponding chrominance data, comprising the steps of:

(a) limiting the luminance data stored in the memory to values less than or equal to a predetermined threshold value;

(b) selectively writing to the memory substitute luminance data for certain of the stored luminance data, wherein the values of the substitute luminance data are greater than the predetermined threshold value; and (c) generating luminance data and corresponding chrominance data for display on the display device, wherein the generated luminance data and corresponding chrominance data are equal to the luminance data and corresponding chrominance data stored in the memory for luminance data that are less than or equal to the predetermined threshold value and wherein the generated luminance data and corresponding chrominance data are equal to luminance data and corresponding chrominance data representing high resolution color graphic elements for luminance data that are greater than the predetermined threshold value.

12. The method as claimed in claim 11 further comprising the step of digitizing color video signals into the luminance data and corresponding chrominance data.

13. The method as claimed in claim 12 wherein the color video signals are digitized into luminance data and corresponding chrominance data, wherein the chrominance data are at a lower resolution than are the luminance data.

14. The method as claimed in claim 12 wherein the color video signals are YIQ color video signals.

15. The method as claimed in claim 12 wherein the color video signals are RGB color video signals.

16. The method as claimed in claims 11, 12, 14 or 15 wherein the step of limiting the luminance data to values less than or equal to a predetermined threshold value is performed by a computer and computer program, wherein the computer program reviews the luminance data stored in the memory and limits the luminance data to values less than or equal to the predetermined threshold value.

17. The method as claimed in claim 11 wherein the luminance data and corresponding chrominance data for display on the display device are generated by one or more lookup tables.

18. An apparatus for inserting high resolution color graphic element sinto a digitized color video image for display on a display device, wherein the color video image is stored in a memory as luminance data and corresponding chrominance data, and wherein the values of the luminance and corresponding chrominance data re binary values in a range of binary states, comprising:

(a) limiting means connected to the memory for limiting the values of the luminance data stored in the memory to binary states that are within a predetermined subset of the total range of binary states;

(b) memory writing means connected to the memory for selectively writing to the memory substitute luminance data for certain of the stored luminance data, wherein the values of the substitute luminance data re not within the predetermined subset of the total range of binary states; and (c) lookup table means connected to the memory for sequentially receiving from the memory the luminance data and corresponding chrominance data and for generating luminance data and corresponding chrominance data for display on the display device, wherein the luminance data and corresponding chrominance data generated by the lookup table means are equal to the luminance data and corresponding chrominance data received from the memory luminance data received from the memory that have values that are within the predetermined subset of the total range of binary states and wherein the luminance data and corresponding chrominance data generated by the lookup table means are equal to luminance data and corresponding chrominance data representing high resolution color grpahic elements for luminance data received from the memory that have values that are not within the predetermined subset of the total range of binary states.

19. The apparatus as claimed in claim 18 wherein the limiting means is a computer and computer program for reviewing the luminance data stored in the memory means, wherein the computer program limits the luminance data to values that are within the predetermined subset of the total range of binary states.

20. The apparatus as claimed in claim 18 wherein the lookup table means comprises:

(a) a first lookup table means connected to the memory for generating luminance data and corresponding chrominance data in response to receiving luminance data from the memory that have values that are within the predetermined subset of the total range of binary states, wherein the luminance data and corresponding chrominance data generated by the first lookup table means are equal to the luminance data and corresponding chrominance data received from the memory; and (b) a second lookup table means connected to the memory for generating luminance data and corresponding chrominance data in response to receiving luminance data from the memory that have values that are not within the predetermined subset of the total range of binary states, wherein the luminance data and corresponding chrominance data generated by the second lookup table means are equal to luminance data and corresponding chrominance data representing high resolution color graphic elements;

wherein the luminance data and corresponding chrominance data generated by the lookup table means are equal to the luminance data and corresponding chrominance data generated by the first lookup table means for luminance data received from the memory that have values that are within the predetermined subset of the total range of binary states and wherein the luminance data and corresponding chrominance data generated by the lookup table means are equal to the luminance data and corresponding chrominance data generated by the second lookup table means for luminance data received from the memory that have values that are not within the predetermined subset of the total range of binary states.

21. The apparatus as claimed in claim 18 wherein the color video image is stored in a memory as luminace data and corresponding chrominance data, wherein the chrominance data are stored in memory at a lower resolution than are the luminance data.

22. A video graphic system for inserting high resolution color graphic elements into a digitized color video image for display on a display device, wherein color video signals are coupled to a video input of the video graphic system, wherein the color video signals are suitable for digitization into luminance data and corresponding chrominance data, and wherein the luminance data and corresponding chrominance data are binary values in a range of binary states, and wherein the luminance data and corresponding chrominance data can be displayed on a display device, the video graphic system comprising:

(a) limiting means connected to the video input for limiting at least one of the color video signals coupled to the video input;

(b) digitization means connected to the limiting means for digitizing the color video signals output from the limiting means into luminance data and corresponding chrominance data, wherein the luminance data obtained from digitization of the color video signals are limited to vinary states that are within a predetermined subset of the total range of binary states;

(c) memory means connected to the digitization means for storing the luminance data and corresponding chrominance data;

(d) memory writing means connected to the memory means for selectively writing to the memory means substitute luminance data for certain of the stored luminance data, wherein the values of the substitute luminance data are not within the predetermined subset of the total range of binary states; and (e) lookup table means connected to the memory means for sequentially receiving from the memory the luminance data and corresponding chrominance data and for generating luminance data and corresponding chrominance data for display on the display device, wherein the luminance data and corresponding chrominance data generated by the lookup table means are equal to the luminance data and corresponding chrominance data received from the memory means for luminance data received from the memory means that are within the predetermined subset of the total range of binary states and wherein the luminance data and corresponding chrominance data generated by the lookup table means are equal to luminance data and corresponding chrominance data representing high resolution color graphic elements for luminance data received from the memory means that have values that are nto within the predetermined subset of the total range of binary states.

23. The video graphic system as claimed in claim 22 wherein the color video signals are YIQ color video signals.

24. The video graphic system as claimed in claim 22 wherein the color video signals are RGB color video signals.

25. The video graphic system as claimed in claim 24 wherein the lookup table means comprises:

(a) a first lookup table means connected to the memory for generating luminance data and corresponding chrominance data in response to receiving luminance data from the memory that have values that are within the predetermined subset of the total range of binary states, wherein the luminance data and corresponding chrominance data generated by the first lookup table means are equal to the luminance data and corresponding chrominance data received from the memory; and (b) a second lookup table means connected to the memory for generating luminance data and corresponding chrominance data in response to receiving luminance data from the memory that have values that are not within the predetermined subset of the total range of binary states, wherein the luminance data and corresponding chrominance data generated by the second lookup table means are equal to luminance data and corresponding chrominance data representing high resolution color graphic elements; wherein the luminance data and corresponding chrominance data generated by the lookup table means are equal to the luminance data and corresponding chrominance data generated by the first lookup table means for luminance data received from the memory that have values that are within the predetermined subset of the total range of binary states and wherein the luminance data and corresponding chrominance data generated by the lookup table means are equal to the luminance data and corresponding chrominance data generated by the second lookup table means for luminance data received from the memory that have values that are not within the predetermined subset of the total range of binary states.

26. The video graphic system as claimed in claim 22 wherein the digitizing means digitizes the color video signals into luminance data and corresponding chrominance data, wherein the chrominance data are at a lower resolution than are the luminance data.

27. A method for inserting high resolution color graphic elements into a digitized color video image for display on a display device, wherein the color video image is stored in a memory as luminance data and corresponding chrominance data, and wherein the values of the luminance and corresponding chrominance data re binary values in a range of binary states, comprising the steps of:

(a) limiting the luminance data stored in the memory to values that are within a predetermined subset of the total range of binary states;

(b) selectively writing to the memory substitute luminance data for certain of the stored luminance data, wherein the values of the substitute luminance data are not within the predetermined subset of the total range of binary states; and (c) generating luminance data and corresponding chrominance data for display on the display device, wherein the generated luminance data and corresponding chrominance data are equal to the luminance data and corresponding chrominance data stored in the memory for luminance data that have values that are within the predetermined subset of the total range of binary states and wherein the generated luminance data and corresponding chrominance data are equal to luminance data and corresponding chrominance data representing high resolution color graphic elements for luminance data that have values that are not within the total range of binary states.

28. The method as claimed in claim 27 further comprising the step of digitizing color video signals into the luminance data and corresponding chrominance data.

29. The method as claimed in claim 28 wherein the color video signals are YIQ color video signals.

30. The method as claimed in claim 28 wherein the color video signals are RGB color video signals.

31. The method as claimed in claim 28 wherein the color video signals are digitized into luminance data and corresponding chrominance data, wherein the chrominance data are at a lower resolution than are the luminance data.

32. The method as claimed in claim 27 wherein the step of limiting the luminance data to values that are within a predetermined subset of the total range of binary states is performed by a computer and computer proram wherein the computer program reviews the luminance data stored in the memory and limits the luminance data to values that are within the predetermined subset of the total range of binary states.

33. The method as claimed in claim 27 wherein the luminance data and corresponding chrominance data for display on the display device are generated by one or more lookup tables.

34. An apparatus for inserting high resolution color graphic elements into a digitized color video image for display on a display device, wherein the color video image is stored in a memory as luminance data and corresponding chrominance data, comprising:

(a) limiting means connected to the memory for limiting the luminance data stored in the memory to values greater than or equal to a predetermined threshold value;

(b) memory writing means connected to the memory means for selectively writing to the memory means substitute luminance data for certain of the stored luminance data, wherein the values of the substitute luminance data are less than the predetermined threshold value; and (c) lookup table means connected to the memory for sequentially receiving from the memory the luminance data and corresponding chrominance data and for generating luminance data and corresponding chrominance data for display on the display device, wherein the luminance data and corresponding chrominance data generated by the lookup table means are equal to the luminance data and corresponding chrominance data received from the memory means for luminance data received from the memory that are greater than or equal to the predetermined threshold value and wherein the luminance data and corresponding chrominance data generated by the lookup table means are equal to luminance data and corresponding chrominance data representing high resolution color graphic elements for luminance data received from the memory that are less than the predetermined threshold value.

35. The apparatus as claimed in claim 34 wherein the limiting means is a computer and computer program for reviewing the luminance data stored in the memory means, wherein the computer program limits the luminance data to values greater than or equal to the predetermined threshold value.

36. The apparatus as claimed in claim 34 wherein the lookup table means comprises:

(a) a first lookup table means connected to the memory for generating luminance data and corresponding chrominance data in response to receiving luminance data from the memory that are greater than or equal to the predetermined threshold value, wherein the luminance data and corresponding chrominance data generated by the first lookup table means are equal to the luminance data and corresponding chrominance data received from the memory; and (b) a second lookup table means connected to the memory for generating luminance data and corresponding chrominance data in response to receiving luminance data from the memory that have values that are not within the predetermined threshold value, wherein the luminance data and corresponding chrominance data generated by the second lookup table means are equal to the luminance data and corresponding chrominance data representing high resolution color graphic element;

wherein the luminance data and corresponding chrominance data generated by the lookup table means are equal to the luminance data and corresponding chrominance data generated by the first lookup table means for luminance data received from the memory that are greater than or equal to the predetermined threshold value and wherein the luminance data and corresponding chrominance data generated by the lookup table means are equal to the luminance data and corresponding chrominance data generated by the second lookup table means for luminance data received from the memory that are less than the predetermined threshold value.

37. The apparatus as claimed in claim 34 wherein the color video image is stored in a memory as luminance data and corresponding chrominance data, wherein the chrominance data are stored in memory at a lower resolution than are the luminance data.

38. A video graphic system for inserting high resolution color graphic elements into a digitized color video image for display on a display device, wherein color video signals are coupled to a video input of the video graphic system, wherein the color video signals are suitable for digitization into luminance data and corresponding chrominance data, and wherein the luminance data and corresponding chrominance data can be displayed on a display device, the video graphic system comprising:

(a) limiting means connected to the video input for limiting at least one of the color video signals coupled to the video input;

(b) digitization means connected to the limiting means for digitizing the color video signals output from the limiting means into luminance data and corresponding chrominance data, wherein the luminance data obtained from digitization of the color video signals are limited to values greater than or equal to a predetermined threshold value;

(c) memory means connected to the digitization means for storing the luminance data and corresponding chrominance data;

(d) memory writing means connected to the memory means for selectively writing to the memory means substitute luminance data for certain of the stored luminance data, wherein the values of the substitute luminance data are less than the predetermined threshold value; and (e) lookup table means connected to the memory means for sequentially receiving from the memory the luminance data and corresponding chrominance data and for generating luminance data and corresponding chrominance data for display on the display device, wherein the luminance data and corresponding chrominance data generated by the lookup table means are equal to the luminance data and corresponding chrominance data received from the memory means for luminance data received from the memory means that are greater than or equal to the predetermined threshold value and wherein the luminance data and corresponding chrominance data generated by the lookup table means are equal to luminance data and corresponding chrominance data representing high resolution color graphic elements for luminance data received from the memory means that are less than the predetermined threshold value.

39. The video graphic system as claimed in claim 38 wherein the color video signals are YIQ color video signals.

40. The video graphic system as claimed in claim 38 wherein the color video signals are RGB color video signals.

41. The video graphic system as claimed in claim 38 wherein the lookup table means comprises:

(a) a first lookup table means connected to the memory for generating luminance data and corresponding chrominance data in response to receiving luminance data from the memory that are greater than or equal to the predetermined threshold value, wherein the luminance data and corresponding chrominance data generated by the first lookup table means are equal to the luminance data and corresponding chrominance data received from the memory; and (b) a second lookup table means connected to the memory for generating luminance data and corresponding chrominance data in response to receiving luminance data from the memory that are less than the predetermined threshold value, wherein the luminance data and corresponding chrominance data generated by the second lookup table means are equal to luminance data and corresponding chrominance data representing high resolution color graphic elements;

wherein the luminance data and corresponding chrominance data generated by the lookup table means are equal to the luminance data and corresponding chrominance data generated by the first lookup table means for luminance data received from the memory that are greater than or equal to the predetermined threshold value and wherein the luminance data and corresponding chrominance data generated by the lookup table means are equal to the luminance data and corresponding chrominance data generated by the second lookup table means for luminance data received from the memory that are less than the predetermined threshold value.

42. The video graphic system as claimed in calim 38 wherein the digitizing means digitizes the color video signals into luminance data and corresponding chrominance data, wherein the chrominance data are at a lower resolution than are the luminance data.

43. A method for inserting high resolution color graphic elements into a digitized color video image for display on a display device, wherein the color video image is stored in a memory as luminance data and corresponding chrominance data, comprising the steps of:

(a) limiting the luminance data stored in the memory to values greater than or equal to a predetermined threshold value;

(b) selectively writing to the memory substitute luminance data for certain of the stored luminance data, wherein the values of the substitute luminance data re less than the predetermined threshold value; and (c) generating luminance data and corresponding chrominance data for display on the display device, wherein the generated luminance data and corresponding chrominance data are equal to the luminance data and corresponding chrominance data stored in the memory for luminance data that are greater than or equal to the predetermined threshold value and wherein the generated luminance data and corresponding chrominance data are equal to luminance data and corresponding chrominance data representing high resolution color graphic elements for luminance data that are less than the predetermined threshold value.

44. The method as claimed in claim 43 further comprising the step of digitizing color video signals into the luminance data and corresponding chrominance data.

45. The method as claimed in claim 44 wherein the color video signals are YIQ color video signals.

46. The method as claimed in claim 44 wherein the color video signals are RGB color video signals.

47. The method as claimed in claim 44 wherein the color video signals are digitized into luminance data and corresponding chrominance data, wherein the chrominance data are at a lower resolution than are the luminance data.

48. The method as claimed in claim 43 wherein the step of limiting the luminance data to values greater than or equal to a predetermined threshold value is performed by a computer and computer program wherein the computer program reviews the luminance data stored in the memory and limits the luminance data to values greater than or equal to the predetermined threshold value.

49. The method as claimed in claim 43 wherein the luminance data and corresponding chrominance data for display on the display device are generated by one or more lookup tables.

* * * * *